United States Patent
Schnell et al.

(10) Patent No.: US 8,837,722 B2
(45) Date of Patent: Sep. 16, 2014

(54) SECURE CONTENT DISTRIBUTION WITH DISTRIBUTED HARDWARE

(75) Inventors: Patrik Schnell, Issaquah, WA (US); James M. Alkove, Redmond, WA (US); Alexandre V. Grigorovitch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1680 days.

(21) Appl. No.: 11/872,832

(22) Filed: Oct. 16, 2007

(65) Prior Publication Data

US 2009/0097642 A1 Apr. 16, 2009

(51) Int. Cl.
| | |
|---|---|
| G06F 21/00 | (2013.01) |
| H04L 29/06 | (2006.01) |
| H04N 21/4627 | (2011.01) |
| G06F 21/10 | (2013.01) |
| H04N 21/418 | (2011.01) |
| H04N 21/8355 | (2011.01) |
| H04N 7/167 | (2011.01) |

(52) U.S. Cl.
CPC ......... *H04N 7/1675* (2013.01); *H04N 21/4627* (2013.01); *G06F 21/10* (2013.01); *H04N 21/4181* (2013.01); *H04N 21/8355* (2013.01)
USPC .......... 380/200; 380/255; 709/232; 709/237; 709/240; 726/1; 726/2; 726/26; 726/27; 726/30; 713/153; 713/168; 713/170; 705/51; 705/54; 705/57; 705/59

(58) Field of Classification Search
USPC ..................................................... 380/200
See application file for complete search history.

(56) References Cited

U.S. PATENT DOCUMENTS

| | | | |
|---|---|---|---|
| 5,907,620 A * | 5/1999 | Klemba et al. ................ 713/189 |
| 6,286,103 B1 * | 9/2001 | Maillard et al. ................ 726/26 |
| 6,516,467 B1 * | 2/2003 | Schindler et al. ............. 725/153 |
| 6,550,011 B1 * | 4/2003 | Sims, III ....................... 713/193 |
| 6,748,080 B2 * | 6/2004 | Russ et al. ..................... 380/239 |
| 7,095,854 B1 * | 8/2006 | Ginter et al. .................. 380/233 |
| 7,266,691 B1 * | 9/2007 | Ishiguro et al. ............... 713/168 |
| 7,555,464 B2 * | 6/2009 | Candelore ....................... 705/59 |
| 7,813,822 B1 * | 10/2010 | Hoffberg ........................ 700/94 |
| 7,864,960 B2 * | 1/2011 | Green et al. ................... 380/277 |
| 8,566,247 B1 * | 10/2013 | Nagel et al. ..................... 705/59 |
| 2002/0067914 A1 * | 6/2002 | Schumann et al. ............. 386/98 |
| 2002/0082997 A1 * | 6/2002 | Kobata et al. .................. 705/51 |

(Continued)

OTHER PUBLICATIONS

Sendmail, Inc., 'Sendmail Encryption—Policy-Based Encryption with Voltage IBE', Sendmail, Inc., 2007, entire document, https://www.sendmail.com/pdfs/resources/DS_encryption_9_07.pdf.*

(Continued)

*Primary Examiner* — Kambiz Zand
*Assistant Examiner* — Ronald Baum
(74) *Attorney, Agent, or Firm* — Micah Goldsmith; Glen Johnson; Micky Minhas (57) ABSTRACT

This document describes tools capable of securely distributing entertainment content among and using distributed hardware. These tools may do so robustly by rebinding entertainment content between distributed hardware units. The tools, for example, may distribute content protection in hardware between a policy unit, a transcryption unit, a graphics processing unit, and a playback unit. By so doing the tools enable, among other things, users to select from many graphics cards rather than rely on the graphics capabilities of an integrated (e.g., SOC) hardware solution.

19 Claims, 7 Drawing Sheets

(56) References Cited

U.S. PATENT DOCUMENTS

| | | | |
|---|---|---|---|
| 2003/0076955 A1 | 4/2003 | Alve et al. | |
| 2004/0103312 A1 | 5/2004 | Messerges et al. | |
| 2004/0109059 A1* | 6/2004 | Kawakita | 348/143 |
| 2004/0153411 A1* | 8/2004 | Viger et al. | 705/51 |
| 2004/0158712 A1* | 8/2004 | Lee et al. | 713/165 |
| 2005/0010790 A1* | 1/2005 | Lang et al. | 713/193 |
| 2005/0071663 A1 | 3/2005 | Medvinsky et al. | |
| 2005/0144468 A1 | 6/2005 | Northcutt et al. | |
| 2006/0010500 A1* | 1/2006 | Elazar et al. | 726/27 |
| 2006/0072748 A1* | 4/2006 | Buer | 380/44 |
| 2006/0123485 A1 | 6/2006 | Williams | |
| 2006/0179489 A1* | 8/2006 | Mas Ribes | 726/27 |
| 2007/0118879 A1 | 5/2007 | Yeun | |
| 2007/0156590 A1 | 7/2007 | Yoon et al. | |
| 2007/0156603 A1* | 7/2007 | Yoon et al. | 705/59 |
| 2007/0162979 A1 | 7/2007 | Kamperman et al. | |
| 2007/0172069 A1 | 7/2007 | Kim et al. | |
| 2007/0250911 A1* | 10/2007 | Nimon et al. | 726/4 |
| 2008/0162170 A1* | 7/2008 | Kumar et al. | 705/1 |
| 2009/0313471 A1* | 12/2009 | Bjorkengren et al. | 713/170 |

OTHER PUBLICATIONS

Buhse, "The Open Mobile Alliance releases OMA DRM 2.0—moving from OMA 1.0 onwards", pp. 1-5.

Pestoni, et al., "xCP: Peer-to-Peer Content Protection", IEEE Signal Processing Magazine, Mar. 2004, IEEE, pp. 71-81.

* cited by examiner

SECURE CONTENT DISTRIBUTION WITH DISTRIBUTED HARDWARE

BACKGROUND

Users enjoy entertainment content in many different ways. Users can enjoy content in ways dictated by a traditional content distributor such as a radio station or movie theater by listening to songs on the radio or watching movies in the theater. Users also enjoy content using physical media usually purchased from another type of content distributor, e.g., through purchasing songs on CD or movies on DVD from a store.

More recently, users have been able to access entertainment content digitally, either by recording content or accessing content through services that provide content according to subscription, purchase, rental or other such business models. Content acquired this way may permit more flexible ways to pay for and use content including accessing content for a period of time, e.g., by subscribing to a service that allows them to play a large collection of songs on their portable media player for 30 days. Another flexible way is to pay to save or download content a certain number of times, e.g., "buying" a song to have a right to download it to a number of computers and then transfer it to a certain number of devices. Still another way is similar to renting a movie in a local video store, in that a user pays to enjoy the content during a period of time, such as to play a movie on his television during a weekend.

These newer services, however, have had significant challenges to overcome in order to distribute entertainment content securely. Software-based protections, for example, require constant investment in new technology to prevent pirated copies and other misuse of the content. In part because of this, System On a Chip (SOC) hardware solutions were developed. These current hardware solutions are generally oriented around fairly straightforward playback pipelines. These pipelines have an input stage, decryption and key management stage, a decoding stage, and an output stage. All of these stages are performed internally by the SOC hardware solution, which helps keep the content secure.

Because these stages are performed internally on one integrated chip, however, the SOC hardware solution includes a limited number of particular graphics and/or audio output hardware and restricts the scenarios primarily to playback. With such limited output hardware current SOC hardware solutions may not be able to output to more than one type of device, e.g., to televisions but not to computer monitors.

Further, these SOC hardware solutions often fail to account for many of the complexities around distributed policy evaluation and content protection and for many scenarios consumers expect to use to be able to enjoy their content. They also often fail to adequately address Digital Rights Management (DRM) domains. DRM domains enable usage of content across devices and personal computers that are members of a domain.

These failures of SOC hardware solutions may be especially problematic for users wishing to use entertainment content with their personal computers, mobile devices, and the like. A user wishing to view a music video on his or her laptop computer purchased from a subscription music service, for example, may not be able to easily view that video using his or her high-end graphics card. The user may instead have to rely on the graphics capabilities of the SOC hardware solution, which is often redundant or inferior to his or her high-end graphics card. In short, two example limitations of the SOC hardware solutions include lower-resolution video playback or not being able to play the content on a desired device, though higher cost or other limitations may also exist.

SUMMARY

This document describes tools capable of securely distributing entertainment content among and using distributed hardware. These tools may do so robustly by rebinding entertainment content between distributed hardware units. The tools, for example, may distribute content protection in hardware between a policy unit, a transcription unit, a graphics processing unit, and a playback unit. By so doing the tools enable, among other things, users to select from many graphics cards rather than rely on the graphics capabilities of an integrated (e.g., SOC) hardware solution.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears except for FIGS. 3 and 6; FIG. 3 starts with the number two for consistency with FIG. 2, FIG. 6 starts with the number five for consistency with FIG. 5. The use of the same reference numbers in different instances in the description and the figures may indicate similar or identical items.

DETAILED DESCRIPTION

Overview

To distribute entertainment content more securely than typically permitted by software alone, integrated hardware solutions, such as SOC hardware solutions, were developed. These integrated hardware solutions may have various modules that perform various functions, each of which communicates with at least one of the other modules. Having all of these modules on one integrated chip permits communications between the modules to be unencrypted. The communications can be unencrypted because someone wishing to steal the content would likely have to cut open the chip to gain access to unencrypted content (e.g., to tap into communications between the modules). This would be very difficult given the typical integration of these modules and the size of the communication conduits, some of which are in the nanometer range.

While these integrated hardware solutions have this inherent security, they suffer from this integration—a typical SOC hardware solution has one particular kind of graphics/audio processing hardware. Thus, one SOC may handle entertainment content for a television but not permit that same entertainment content to be rendered on a user's computer monitor or portable media device (e.g., cell phone). In short, one SOC typically only outputs to one type of rendering device, usually a television having certain capabilities but not many other devices or graphics/audio cards that a user may want to use.

Further still, these integrated hardware solutions often do not permit manipulation or interaction with their output. If a user wants to play a movie on his computer monitor and also see email or otherwise have more than just the movie be integrated into the display on his monitor, the integrated hardware solution may not permit it, even if the integrated hardware solution were capable of providing content usable by the user's monitor.

Distributing functions performed by these integrated hardware solutions, however, creates various security challenges. The tools described herein address these security challenges effective to enable secure content distribution among and using distributed hardware. By so doing the tools enable, among other things, content to be rendered by many different devices. A user could, for example, receive rights to a particular music video and play that music video not just on one type of device by nearly any device: his cell phone, his PDA, his laptop, his analog television, and his 52-inch high-definition plasma monitor.

In the following discussion, an example environment is first described in which the tools may operate to securely distribute entertainment content among and using distributed hardware. An example procedure and communications pipeline are then described that may be employed in the example environment, as well as in other environments. Although these tools are described as employed within a personal computing environment in the following discussion, it should be readily apparent that these tools may be incorporated within a variety of environments without departing from the spirit and scope thereof.

Example Environment

Figure 1:
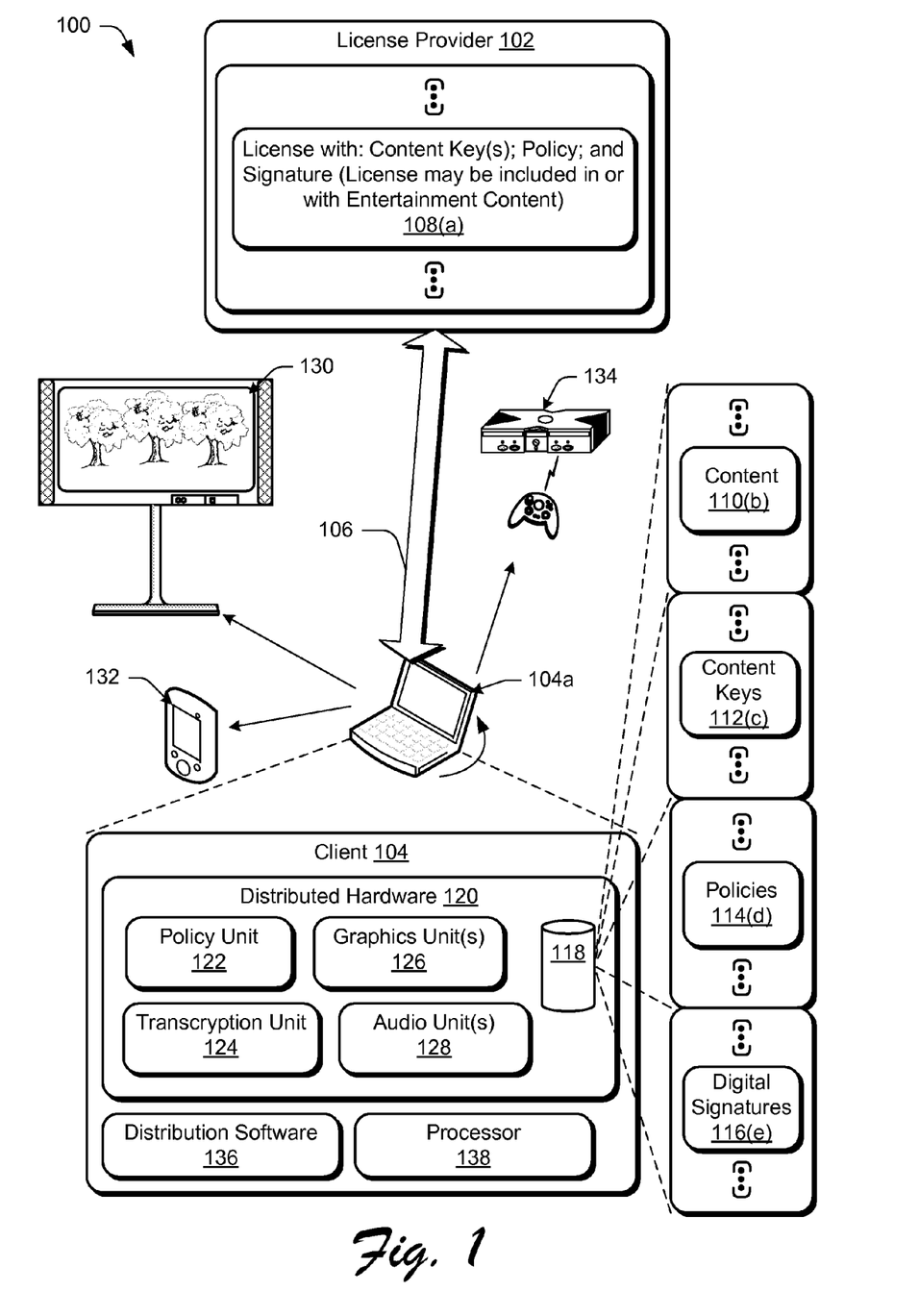
FIG. 1 is an illustration of an environment in which an example implementation of the tools may operate to securely distribute entertainment content among and using distributed hardware.

FIG. 1 is an illustration of an environment 100 in an example implementation in which the tools may operate to securely distribute entertainment content among and using distributed hardware. Environment 100 includes a license provider 102 communicatively coupled to a client 104 via a network connection 106. In the following discussion, the license provider and the client may represent one or more entities and therefore reference may be made to a single entity (e.g., the client 104) or multiple entities (e.g., the clients 104, the plurality of clients 104, and so on). The license provider, for example, may include a content delivery server or a domain controller. Additionally, although a single network connection 106 is shown, it may represent network connections achieved using a single network or multiple networks. For example, network connection 106 may be representative of a broadcast network with back-channel communication, an Internet Protocol (IP) network, and so on.

Client 104 may be configured in a variety of ways. For example, the client may be configured as a computer that is capable of communicating over the network connection 106, such as a desktop computer, a mobile station, an entertainment appliance, a laptop communicatively coupled to a display device, mobile media player, and/or video game as illustrated, a wireless phone, and so forth. For purposes of the following discussion, the client may also relate to a person and/or entity that operate the client. In other words, client 104 may describe a logical client that includes a user, software, and/or a machine.

License provider 102 includes one or more licenses 108(a), where "a" can be any integer from 1 to "A". The licenses 108(a) may include a variety of data, such as cryptographic keys, content policies, and digital signatures. The licenses 108(a) are communicated over network connection 106 to client 104.

Licenses are used to enable a client to consume and interact with entertainment content, such as music videos, songs, still images, gaming software, movies, television programming, and video-on-demand (VOD) files, and well as other renderable media or usable software or files, given the rights and restrictions specified in the policy of the license.

Licenses 108(a) may be stored in, with, or separate from pieces of content 110(b), including as one or more items of content keys 112(c), policies 114(d), and digital signatures 116(e), where any of "b", "c", "d", and "e" can be any integer from "1" to "B", "C", "D", and "E", respectively, in one or more memory 118. In some cases the content, content keys, policies, and digital signatures may be different in totality from those received by the license provider, such as if these are altered after receipt, are received from some other source, or are previously stored on the client. These content, keys, and polices may be referred to herein with same or similar numbers whether altered (e.g., decrypted or re-encrypted) or not.

Memory 118 may be configured in a variety of ways, such as a hard disk drive, a removable computer-readable medium (e.g., a writable digital video disc), semiconductor-based memory, and so on.

Client 104, as previously stated, may be configured in a variety of ways to receive licenses 108(a) through the network connection and from the license provider. The client in whatever configuration it, the network connection, or the license provider are arranged, has access to content and policy associated with that content.

Client 104, as illustrated in FIG. 1, includes distributed hardware 120. The distributed hardware includes or has access to a policy unit 122 and includes a transcryption unit 124. The distributed hardware also either includes or has access to graphics unit(s) 126, audio unit(s) 128, and memory 118. If the client is a laptop computer, for example, the graphics unit and audio unit may be on the laptop for rendering on the laptop's own screen (shown as 104a and with communication illustrated with an arrow) or on another monitor, such as the screen with speakers shown at 130 (communication also illustrated with an arrow). The client may also not include the graphics units and audio units (or even the policy unit) that are being used, such as when the client provides content to graphics units and audio units on devices that have their own, such as a mobile display device 132 (e.g., a cell phone, PDA, MP3 player) having a graphics card.

In some cases a graphics or audio unit is not needed, such as when a gaming device 134 includes a decryption unit to receive and decrypt content (e.g., gaming software) from transcryption unit 124.

Policy unit 122 is capable of determining policy 114(d) associated with content 110(b). In some cases the policy unit receives license 108(a), parses the license to provide the policy (e.g., rights and restrictions for using the content) pertaining to the entertainment content associated with that license. Assuming the rights and restrictions are favorable for the user to use that content, the policy unit is capable of passing policy 114(d) to the transcryption unit. The policy unit may also receive a content key 112(c) encrypted with the public key of transcryption unit 124 and the public key of the policy unit. After favorable evaluation of the policy, the policy unit may decrypt the content key 112(c) using its private key. It may then pass the content key to the transcryption unit over a secure authenticated channel.

In such cases where the content key is doubly encrypted, the policy unit decrypts the content key before it is passed to the transcryption unit. After decryption, the content key is still encrypted with the public key corresponding to the transcryption unit's private key. In this case the policy unit does not have direct access to the content key. In addition, the transcryption unit will not have access to the content key, unless the policy unit favorably evaluates the policy and as a result decrypts the content key.

In some cases client 104 is a member of a DRM domain and the content key is encrypted with a public key corresponding to a domain. If the policy requires that the content only be useable if the client has a hardware transcryption unit, the domain may have as many as three separate key pairs. One key pair corresponds to policy units, one key pair corresponds to devices with a software transcryption unit, and one key pair corresponds to devices with a hardware transcryption unit.

In the case of domain-bound content that requires a client or device with a hardware transcryption unit, the double encryption of the content key may be done by first encrypting the content key with the domain public key corresponding to the hardware class of transcryption units followed by encrypting the encrypted content key with the domain public key corresponding to policy units.

In the case where the domain-bound content does not require that a client or device have a hardware transcryption unit, the content key may be doubly encrypted with the domain public key corresponding to the software class of transcryption units. A hardware transcryption unit may have both classes of keys, while a software transcryption unit will only have the software class key. In some cases the domain key pair corresponding to the policy unit and the domain key pair corresponding to software transcryption unit may be the same.

The transcryption unit may receive encrypted content 110(b) encrypted with an encrypted content key 112(c) along with the policy. Both the content and key are not necessarily received from the policy unit. The transcryption unit may decrypt (and combine in some cases) the content and policy. The policy and content are then sent to another unit, such as graphics unit 126 and/or audio unit 128.

These graphics, audio, or other units are capable of decoding the policy and content (whether combined or not), processing the content to make it usable by the output units (e.g., rendering devices like monitors and mobile devices or gaming units), processing the policy (if needed) to be usable by the device or gaming unit, and passing these processed policies and contents to the output units.

The graphics unit and audio unit are capable of receiving the content samples, decrypting the samples, decoding the samples, processing the samples, and mixing them together (if needed). The mixed output is then sent to the output unit or device. This mixing permits audio or video from other sources to be mixed into the content, such as dialog boxes or simple text overlaying a movie or an audio notification integrated with a song being played.

The client is illustrated as executing distribution software 136 using processor(s) 138 to facilitate distribution of entertainment content among and/or using distributed hardware. The software is illustrated on client 104 separate from memory 118, though it may be stored as computer-readable media in memory 118. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions of the software may be electronically-executable instructions. Additionally, although a single memory 118 is shown for the client 104, a wide variety of types and combinations of memory may be employed, such as random access memory (RAM), hard disk memory, removable medium memory, and other types of computer-readable media. This memory may even be integrated within one or more of units 122, 124, 126, or 128.

It should be noted that one or more of the entities shown in FIG. 1 may be further divided (e.g., client 104 may be implemented by a plurality of servers in a distributed computing system), combined (e.g., client 104 may incorporate functionality of outside sources like device 132), and so on and thus the environment 100 of FIG. 1 is illustrative of one of a plurality of different environments that may employ or be usable by the described tools.

Generally, any of the functions described herein can be implemented using software, firmware, hardware (e.g., fixed-logic circuitry), manual processing, or a combination of these implementations. The terms "unit" and "device" as used herein generally represent software, firmware, hardware, or a combination thereof, except in the case of transcryption unit 124 and at least one unit downstream from the transcryption unit (if software-based security is not permitted by the applicable policy), which includes at least some hardware.

In the case of a partial software implementation, distribution software 136 represents some program code that performs specified tasks when executed on a processor (e.g., CPU or CPUs). The program code can be stored in one or more computer-readable memory devices, such as the memory 118. The tools for securely distributing entertainment content among and using distributed hardware may be platform-independent except for the one or more units of distributed hardware, meaning that the tools may be implemented on a variety of commercial computing platforms having a variety of processors.

Example ways in which these units may operate, as well as details about how each may securely communicate with each other are set forth in greater detail below. The above description is intended as a non-limiting and general overview of environment 100.

Example Components

The following discussion illustrates example logical components for policy unit 122, transcryption unit 124, graphics unit 126, and audio unit 128. Although portions of the following discussion refer to the environment 100 of FIG. 1, the following discussion should not necessarily be limited to that environment 100, as these units may include other components than those described in FIG. 1. After illustrating and listing the logical components in FIGS. 2 and 3, this discussion turns to FIG. 4 to show hardware implementations of transcryption unit 124 and graphics unit 126.

Figure 2:
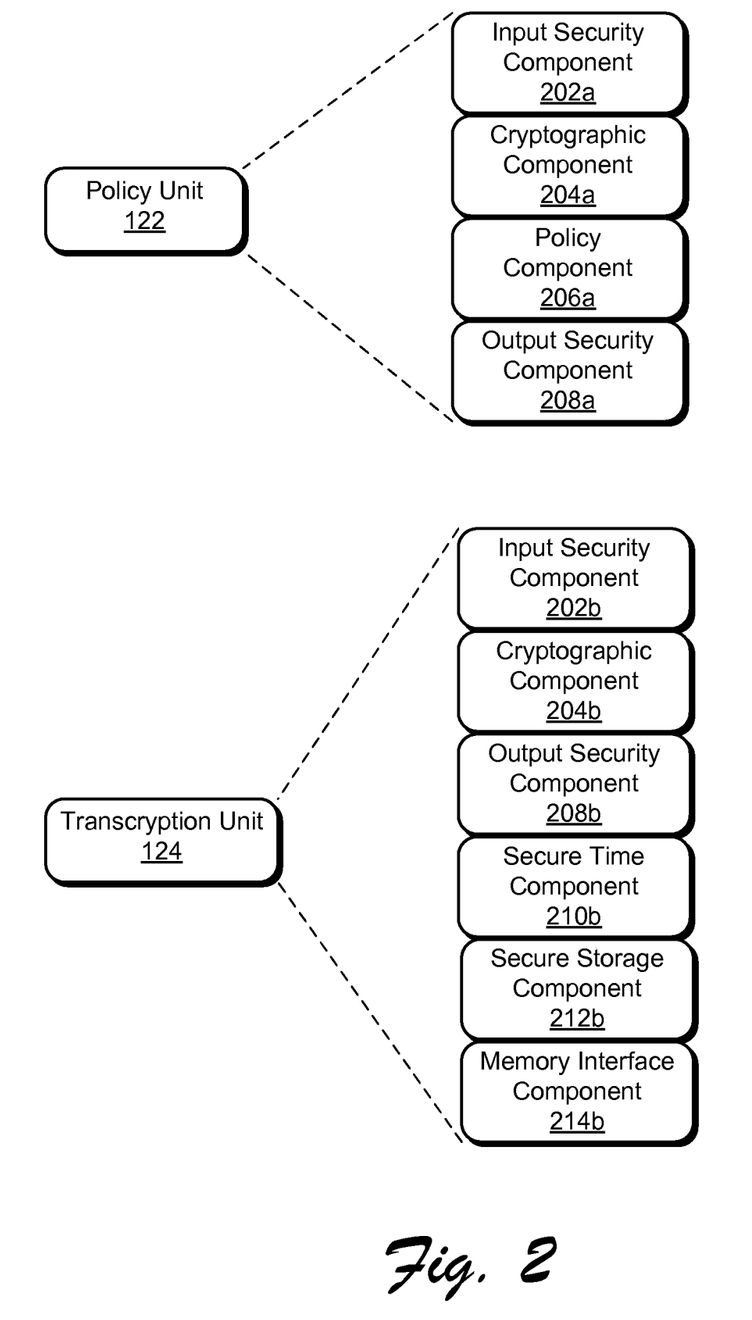
FIG. 2 is an illustration of an example embodiment of logical components of the policy unit and transcription unit of FIG. 1.

FIG. 2 depicts policy unit 122 having the following logical components: an input security component 202a, a cryptographic component 204a, a policy component 206a, and an output security component 208a. Input security component 202a can establish and communicate information over a secure authenticated channel.

Cryptographic component 204a contains a robust implementation of cryptographic algorithms and protected registers for storing keys and the cryptographic algorithms. Policy component 206a can evaluate and update a policy (e.g., policy 114 associated with content 110). Output security component 208a can establish and communicate information (e.g., policy 114, content 110) over a secure authenticated channel and verify revocation of a downstream input security component (e.g., that of transcryption unit 124).

Transcryption unit 124 has the following logical components: an input security component 202b, a cryptographic component 204b, an output security component 208b, a secure time component 210b, a secure storage component 212b, and a memory interface component 214b. Each of input security component 202b, cryptographic component 204b, and output security component 208b act similarly to those numbered similarly in the policy unit, though they communicate with different other units or components (e.g., the input security component 202b communicates upstream with the policy unit rather than upstream with license provider 102).

Secure time component 210b can securely manage time with protection against clock rollbacks (clock rollbacks are often an attempt to keep using content after an expiration period in a policy has expired). Secure storage component 212b can securely store and retrieve data with protections against replay attacks. Memory interface component 214b can store and receive data encrypted in memory (e.g., when the memory used is not integrated physically with the transcryption unit).

Figure 3:
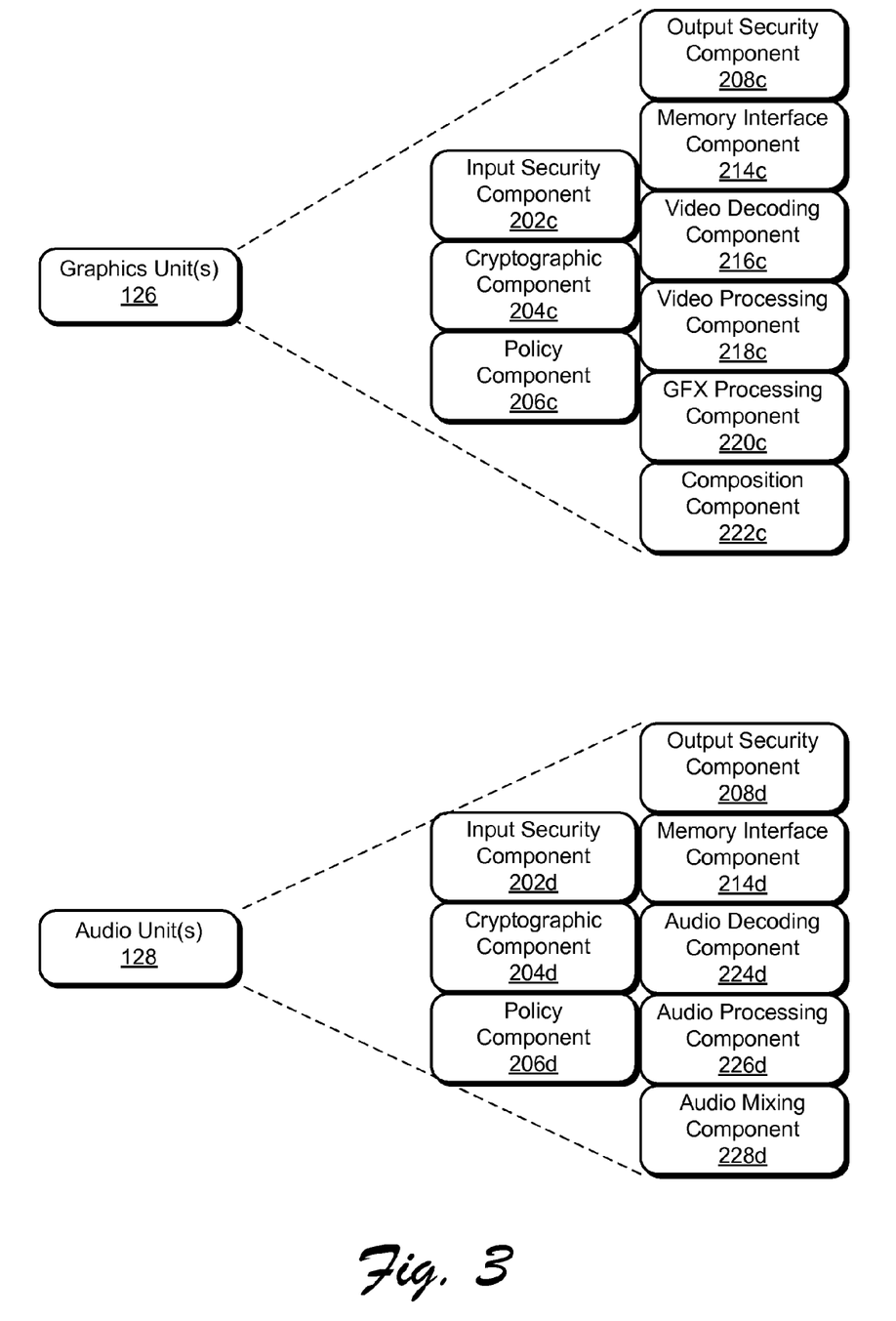
FIG. 3 is an illustration of an example embodiment of logical components of the graphics unit and audio unit of FIG. 1.

FIG. 3 depicts graphics unit 126 having the following logical components: an input security component 202c, a cryptographic component 204c, a policy component 206c, an output security component 208c, a memory interface component 214c, a video decoding component 216c, a video processing component 218c, a graphics (GFX) processing component 220c, and a composition component 222c. Each of input security component 202c, cryptographic component 204c, policy component 206c, output security component 208c, and memory interface component 214c act similarly to those numbered similarly in the policy unit and/or transcryption unit, though they communicate with different other units or components (e.g., the input security component 202c communications upstream with the transcryption unit).

Video decoding component 216c can decode video streams. Video processing component 218c can decompress and process video streams. Graphics (GFX) processing component 220c is an abstraction of a general processing unit and can perform functions that a general processing unit can perform. Composition component 222c can composite surfaces into a frame buffer.

Audio unit 128 has the following logical components: an input security component 202d, a cryptographic component 204d, a policy component 206d, an output security component 208d, a memory interface component 214d, an audio decoding component 224d, an audio processing component 226d, and an audio mixing component 228d. Each of input security component 202d, cryptographic component 204d, policy component 206d, output security component 208d, and memory interface component 214d act similarly to those numbered similarly in the policy unit, transcryption unit, and/or graphics unit though they communicate with different other units or components (e.g., the input security component 202d communications upstream with the transcryption unit).

Audio decoding component 224d can decode audio streams. Audio processing component 226d can decompress and process audio streams. Audio mixing component 228d mixes decoded audio streams into an output buffer.

These logical components describe example ways in which the units may act and interact logically and the units function to distribute content securely among and/or using distributed hardware, such as according to the process of FIGS. 5 and 6 below.

All of the logical components described may be implemented using hardware and in some cases software as well. Example hardware implementations of transcryption unit 124 and graphics unit 126, for example, are set forth in FIG. 4 below.

Example Hardware

Figure 4:
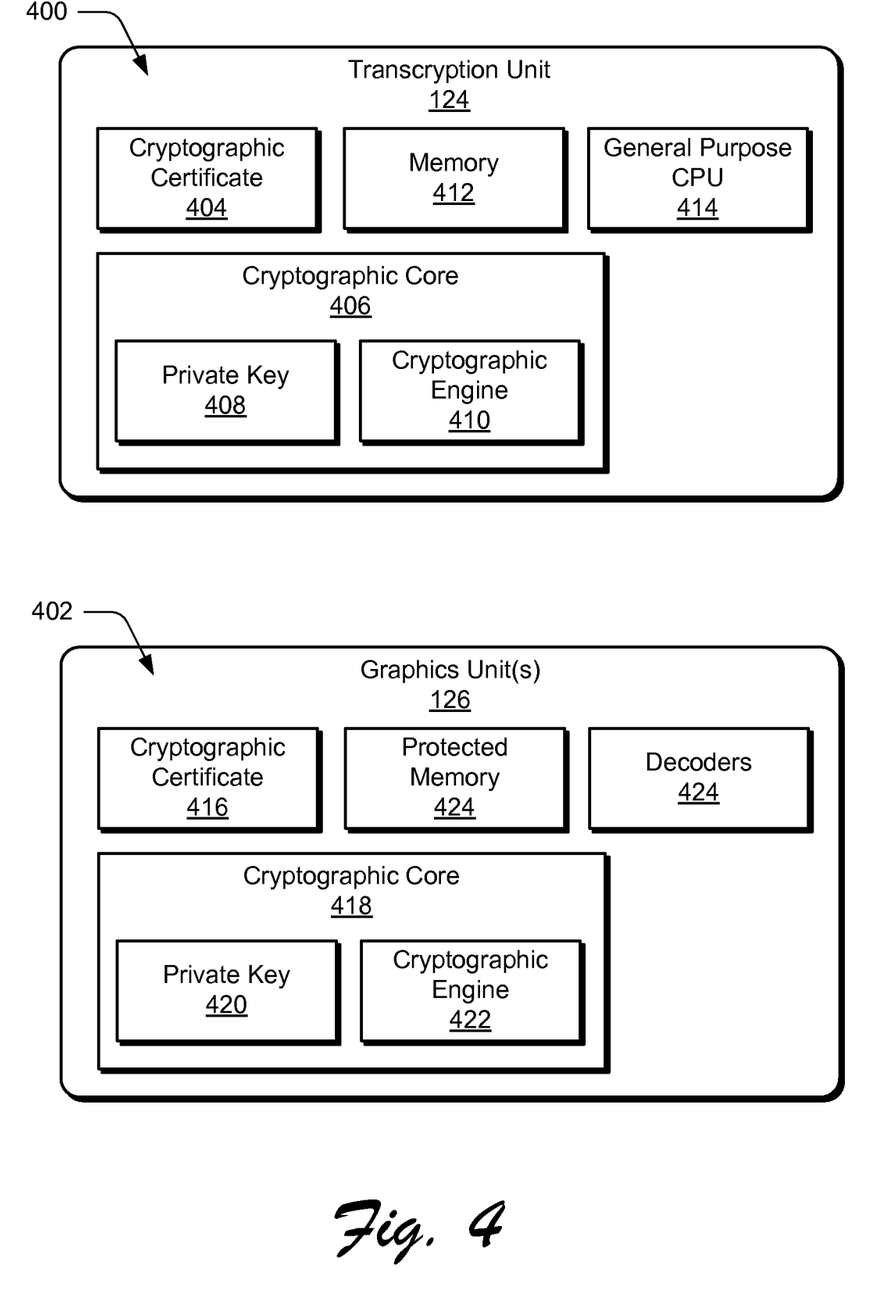
FIG. 4 is an illustration of example hardware implementations of the transcription unit and graphics unit of FIG. 1.

FIG. 4 depicts an example hardware implementation 400 of transcryption unit 124 and example graphics hardware implementation 402 of graphics unit 126. These hardware implementations are capable of performing the functions contemplated by the logical components set forth in FIGS. 2 and 3 and further described below, though these hardware implementations may use external hardware (e.g., processor 138) and/or software (e.g., distribution software 136) to aid in their performance of these contemplated functions.

Hardware implementation 400, sometimes referred to as a hardware "dongle", includes a cryptographic certificate 404, a cryptographic core 406 having a private key 408 and a cryptographic engine 410, memory 412, and a general purpose CPU 414. This hardware implementation of the transcryption unit contains storage for certificates (e.g., certificate 404) and related secrets in memory 412, which may be onboard memory or off-chip. If off-chip the hardware implementation includes an encrypting memory controller for access to off-chip memory. Cryptographic core 406 is capable of managing keys (e.g. private key 408) and decrypting content and keys using cryptographic engine 410 and general purpose CPU 414.

Graphics hardware implementation 402 includes another cryptographic certificate 416, another cryptographic core 418 having another private key 420 and another cryptographic engine 422, protected memory 424, and decoders 424. This implementation 402 can be used for performing the functions of a graphics card or a device having similar functionality, such as one of the graphics cards or rendering devices mentioned above.

Manners in which transcryption unit 124 and graphics unit 126 interact to ensure that a policy associated with particular entertainment content and evaluated at the transcryption unit is enforced in the output device through the graphics unit of a device are described below.

Example Procedure

The following discussion describes ways in which the tools may securely distribute entertainment content among and using distributed hardware, including through reference to the previously described environment, logical components, and hardware implementations. Aspects of this procedure may be implemented in hardware, firmware, or software, or a combination thereof. The procedure is shown as a set of blocks that specify operations performed by the tools, such as through one or more units, devices, or hardware and are not necessarily limited to the orders shown for performing the operations by the respective blocks. In portions of the following discussion, reference will be made to the environment 100 of FIG. 1, logical components of FIGS. 2-3, and hardware implementations of FIG. 4. Many of these blocks, for example, may be performed as contemplated with logical components of FIGS. 2 and 3 or by hardware elements of FIG. 4.

Figure 5:
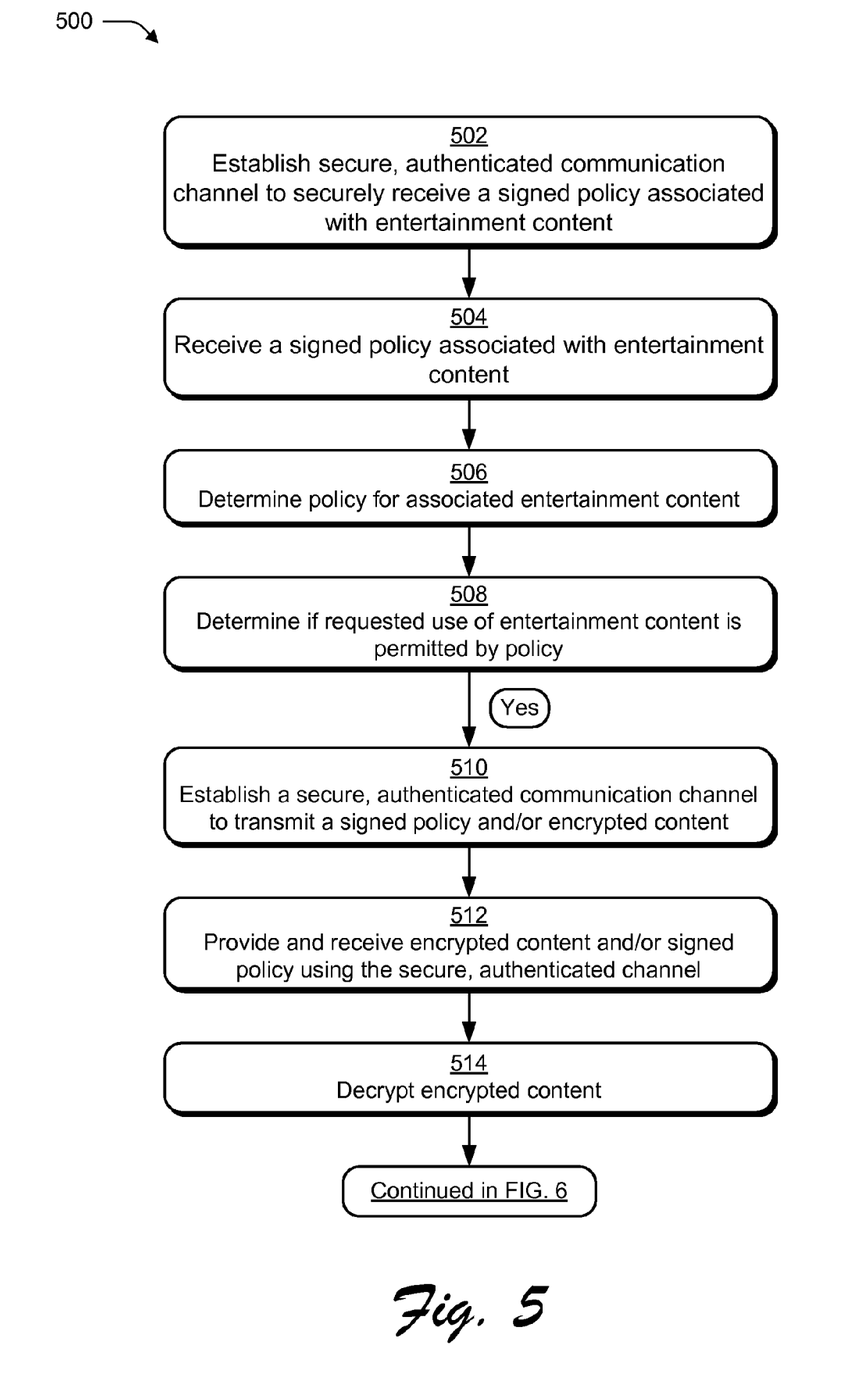
FIGS. 5 and 6 are a flow diagram depicting a procedure in an example implementation in which entertainment content is securely distributed amongst (and using) distributed hardware.
Figure 6:
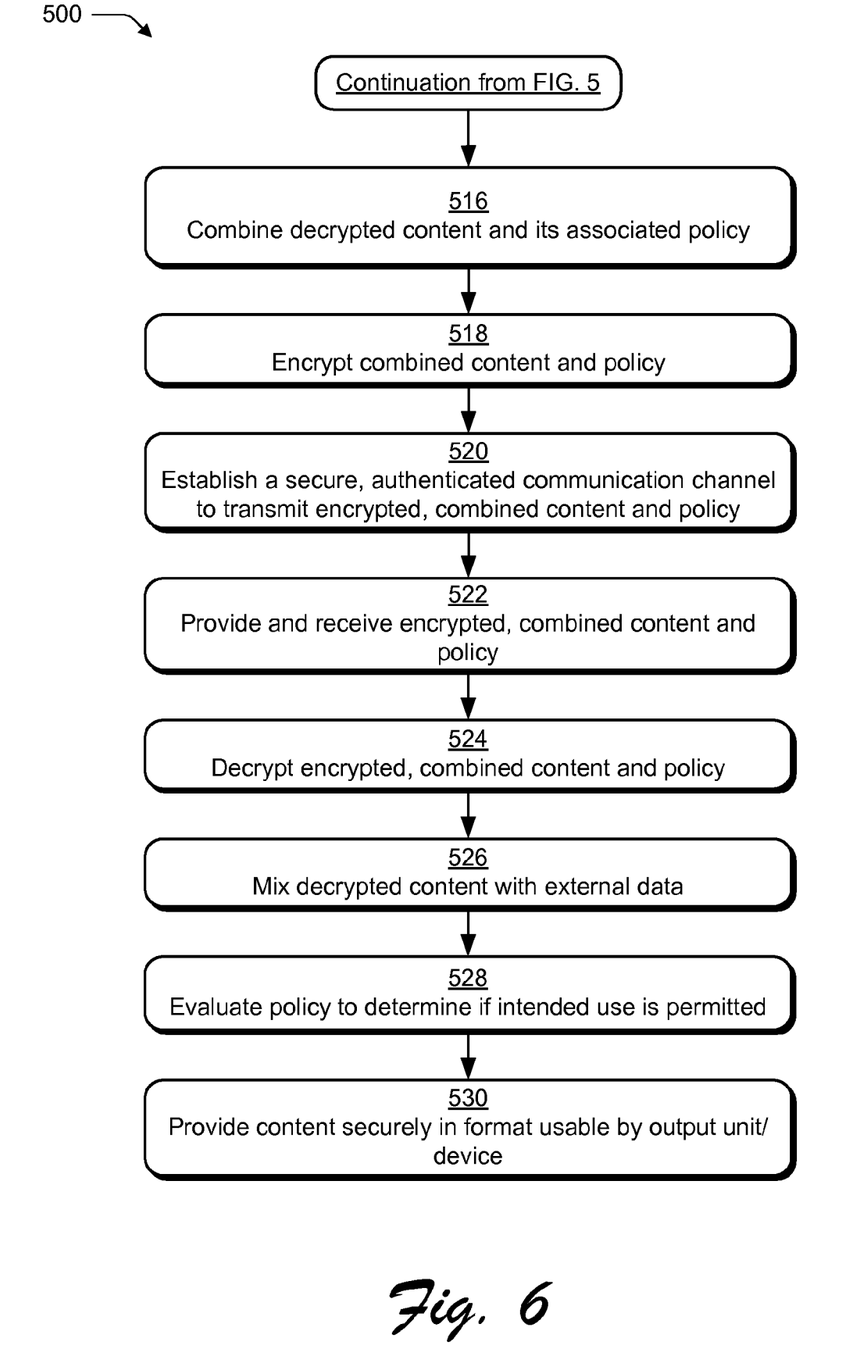

FIGS. 5 and 6 depict a procedure 500 in an example implementation in which entertainment content is securely distributed among and using distributed hardware.

Block 502 establishes a secure, authenticated communication channel to securely receive a signed policy associated with entertainment content.

Policy unit 122, for example, may establish a secure, authenticated communication channel by providing (e.g., through input security component 202a) a verifiable and authentic cryptographic certificate. Once verified by the provider of the policy (e.g., license provider 102), the provider of the policy may sign the policy with its private key, thereby enabling the policy unit (which has a corresponding public key) to verify that the policy has not been tampered with.

Figure 7:
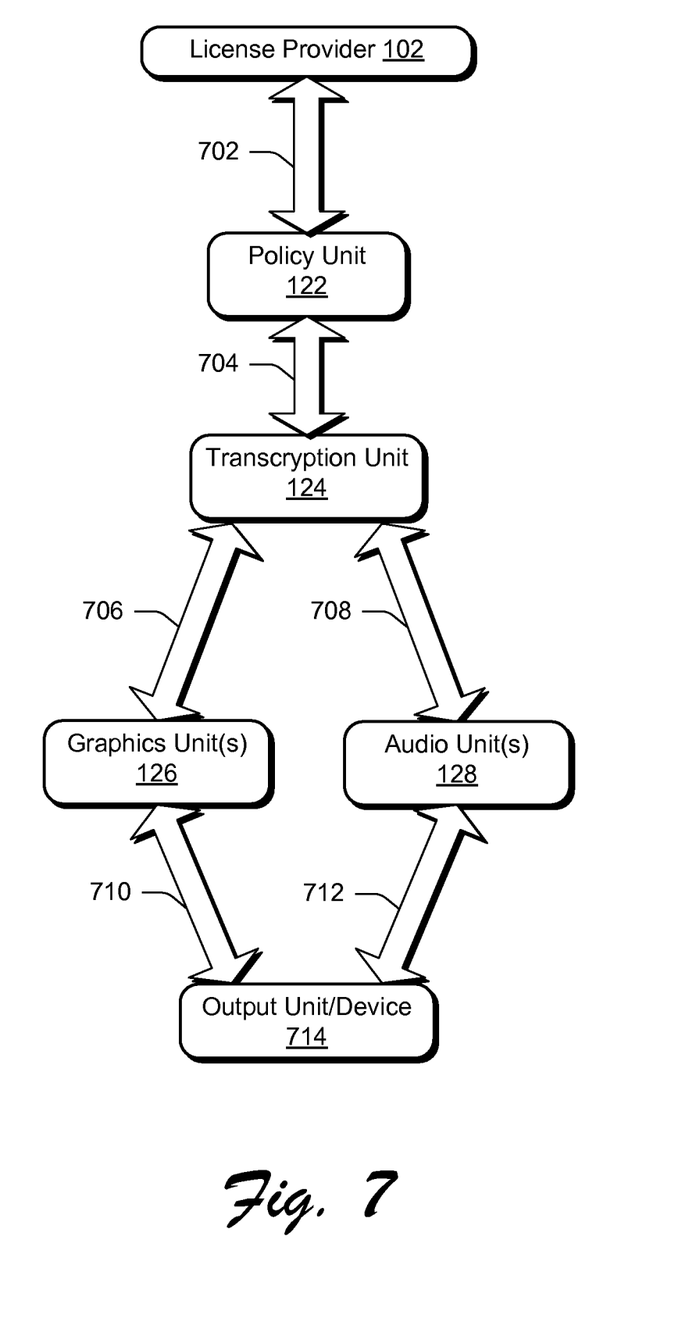
FIG. 7 is an illustration of an example implementation of a secure communications pipeline between units of FIG. 1 and other units.

FIG. 7 illustrates one example implementation of the secure communications and data pipeline between units of FIG. 1. Here policy unit 122 receives signed license 108 across a secure, authenticated channel 702 from license provider 102. This and future channels may be assumed secure and authenticated based on both the sender and receiver both having digital certificates confirmed to be legitimate and transmitting information encrypted with a session key such that only the entity with a private key associated with a confirmed-legitimate digital certificate may decrypt the session key and in using the session key decrypt the information sent over the channel. This may be performed, for example, by input security components 202 and/or output security components 208 of FIGS. 2 and/or 3.

The information may also be received by a conglomerate of the policy unit and transcription unit 124 (not illustrated). If the policy unit and transcription unit are combined (physically on hardware), the policy unit's output security and the transcription unit's input security may be unused. In either case the information is received.

Block 504 receives a policy associated with entertainment content and trusted for authenticity. This policy may be trusted by being signed with a digital certificate that can be verified or in other ways. The policy may be received with other information, such as encrypted content 110 and with all of the parts of license 108: encrypted content key 112, encrypted policy 114, and digital signature 116. Here the digital signature may be used by the policy unit to determine that the provider of the policy is also authentic.

Block 506 determines the policy governing usage rights for entertainment content associated with the policy. The tools may determine the policy (correctly and securely) based on the policy being received through a secure, authenticated channel. In the ongoing example the policy is signed with a private key corresponding to the license issuer's public key. Using this public key the policy unit (e.g., though cryptographic component 204a) may verify the integrity of the policy.

Block 508 determines whether or not a requested use of the entertainment content is permitted by the policy associated with that entertainment content. If permitted the tools proceed to block 510. If not permitted the process ends. Note that information may be received from downstream or upstream components, such as a request to play a music video received from mobile device 132 or to play a high-definition movie from client 104. Continuing the ongoing example, the policy unit may determine, based on the usage rights in the policy, whether or not the requested use is permitted.

Block 510 establishes a secure, authenticated communication channel to securely transmit a policy and/or encrypted content associated with that policy. Block 510 may establish one channel to securely transmit both of these or two channels (e.g., one between the policy unit and the transcription unit and another between the license provider and the transcription unit).

Policy unit 122 and transcription unit 124, for example, may establish a secure, authenticated channel for passing the policy, the entertainment content associated with that policy, and encrypted content key(s) usable to decrypt the content. They may do so using output security component 208a of the policy unit and input security 202b of the transcription unit. The hardware elements of the transcription unit that effectuate these functions may include, for example, cryptographic certificate 404. This certificate may establish that the transcription unit is authentic and trusted by the policy unit (or some other entity having content, such as the license provider).

Block 512 provides encrypted entertainment content and policy using a secure, authenticated channel, such as channel 704. Block 512 may do so by encrypting the policy with the public key of the transcryption unit, for example, such that only the transcryption unit (or some other trusted entity having the same certificate, like multiple computers in a domain) may decrypt the policy. The policy unit may also provide the encrypted content with a content key that is encrypted with the transcryption unit's public key as well. Thus, the content may be doubly encrypted. The content may be encrypted such that the policy unit, or any intervening entity between the transcryption unit and the license provider, may not decrypt the content. This may be performed by the upstream entity encrypting the content key with the transcryption unit's public key before the content key is encrypted with the policy unit's public key and passed to the policy unit.

Note that the content may be cryptographically bound to hardware, thereby potentially providing a hardware-based level of security; in other words, the policy unit or license provider or other entity may encrypt the content or its content key with a key that only a hardware-based entity may have a key to decrypt that content or content key.

Also, in one embodiment the tools may pass the policy and content keys such that the policy and the content keys are tied together. These can be tied together by including an integrity key in the policy that is different each time the content and policy are provided by its provider or at some point upstream from transcryption unit 124. The integrity key is a symmetric cryptographic key that is used to encrypt the hash of the policy. In this particular embodiment, in all places where the content key has been previously encrypted by a public key, such as the public key belonging to the transcryption unit, now the integrity key and the content key are tied together by concatenating the two keys and encrypting them by a public key.

In a domain system (i.e., a logical grouping of devices viewed as one entity and associated with a user or group of users) the tools permit two or more classes of protection. Some devices in the domain might be permitted to render content and some others might not. Thus, if a device (or devices) has a hardware-bound private key (e.g., hardware implementation 400 of transcryption unit 124) it may be permitted to play a certain class of movies but a device having only software-bound private keys would not. The television may be allowed to play content if the policy permits only software-bound protections.

Block 514 decrypts the encrypted content. Block 514 may do so securely based on having a unique private/public key pair. The transcryption unit, for example, may decrypt the content by first decrypting the content key with its private key and then decrypting the encrypted content with the now-decrypted content key. The policy may be signed to permit the transcryption unit (e.g., cryptographic core 406) to determine the authenticity of and/or that the policy has not been tampered with.

Note that this permits distributed hardware to securely distribute entertainment content through at least these two units. If the policy unit is software-based or is integral with the transcryption unit then this is not a distribution between distributed hardware, which is permitted and contemplated by process 500.

Optionally, block 516 combines the decrypted content with it associated decrypted policy. The tools may do so by mapping the two together or concatenating them together, or in other manners known in the art for combining data. By so doing the tools may integrate the content and its policy, which helps enable downstream units to have a correct (e.g., untampered-with policy).

Block 518 encrypts the content effective to enable downstream unit(s) to decrypt the content. The transcryption unit, for example, may encrypt combined content and associated policy with a public key of a downstream entity so that only it or other hardware having the same public and private key (in the case of a domain) may decrypt the content. This encryption and decryption may be performed logically with the cryptographic component 204b of FIG. 2. Hardware-wise this is performed in one implementation using cryptographic core 406 of FIG. 4.

Block 520 establishes a secure, authenticated communication channel to transmit the encrypted, combined content and its associated policy. Block 520 may do so based on authenticating the upstream and downstream units. Thus, the upstream unit (e.g., transcryption unit 124) authenticates downstream units (e.g., graphics unit 126 and audio unit 128) based on their cryptographic certificates (in the case of graphics unit 126, cryptographic certificate 416 of FIG. 4). Likewise, the downstream unit(s) may authenticate the upstream unit based on its certificate (e.g., cryptographic certificate 404 of the transcryption unit). These secure, authenticated channels are shown at 706 and 708.

As noted above, these channels may be secure based on, in one embodiment, the components of both the transcryption unit (output security component 208b) and the graphics and audio units (input security components 202c and 202d, respectively).

Block 522 provides and receives this encrypted, combined content and associated policy effective to enable downstream graphics, audio, or other units/device that are capable of decoding the combined data to process the combined data such that it is usable by output units (e.g., rendering devices like monitors and mobile devices or gaming units).

In some cases the tools act to ensure that the usage rights are updated based on the provision of the content to a downstream device. Assume, for example, that a downstream device requested to make a copy of a music video or play a song. If the policy permits such use but has limitations, such as if the music video may be copied a limited number of times or the song played a limited number of times (or there is an additional charge for playing or copying or information pertaining to a user's use of content is desired), the tools may indicate this usage upstream. Here, for example, the transcryption unit may update the policy to indicate that the user had some usage, such as reducing the limited number of permitted copies by one responsive to sending the content downstream. In any case the tools may indicate usage and/or alter policies associated with entertainment content.

The downstream unit may include a device capable of decrypting the content and policy (e.g., device 132) or a graphics or audio card (e.g., graphics unit 126 and/or audio unit 128).

Block 524 decrypts the encrypted, combined content and policy. Any of these units, assuming the encryption is preformed with its public key, may decrypt the encrypted, combined content and policy. The tools may permit software-based downstream units to receive content encrypted in a manner that the software-based unit may decrypt. The tools may also only permit hardware-based solutions, such as implementation 402 of graphics unit 126 of FIG. 4, to be able to decrypt the content. In some cases this determination by the tools will be based on the policy. Some classes of content may be decryptable by software-based units while other content may not. In the ongoing example only a hardware-based unit having a valid, verified cryptographic certificate is permitted to decrypt the combined content and policy (e.g., by encrypting the content or its content key with the public key of the unit from the certificate).

Block 526 mixes the decrypted content with other, external data, if desired. This mixing with other streams of content/data is optional but may be useful. Adding an audio system alert to a song being played on a computer's speakers, for example, may be performed by the audio unit through mixing the data for the alert with the content. Examples of mixing are mentioned above.

Block 528 evaluates the decrypted, associated policy to determine if intended or requested use of the content is permitted by the policy. If permitted, the tools proceed to block 530.

Block 530 provides the content in a format usable by the output unit or device. This is shown in FIG. 7 through channels 710 and/or 712 to output unit/device 714. Note that these channel may be secure and authenticated similarly to as set forth above for other secure communication or in other ways that permit secure communication to a device capable of outputting (e.g., rendering or displaying) the content (and the mixed-in external content, if applicable).

For blocks 522-530, graphics unit 126, for example, may receive the encrypted, combined content and policy, decrypt the content and associated policy, mix the content with a dialog box data stream, and if the policy permits, provide this mixed content to a computer monitor. The user may then view the entertainment content according to his permitted usage rights as provided in the policy. The user may view it mixed with other data (e.g., dialog box having an email) or hear it mixed with other data (e.g., a chime notifying the user of an upcoming appointment). The user may enjoy this entertainment content and at various different devices as well, such as a mobile device or his or her laptop's monitor.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device comprising:
a transcryption unit implemented, at least in part, in hardware, and configured to perform operations comprising:

establishing one or more first secure, authenticated communication channels with a hardware or software entity or entities capable of providing encrypted entertainment content and an encrypted signed policy associated with said encrypted entertainment content and governing usage rights of said encrypted entertainment content, said encrypted signed policy encrypted with a public key corresponding to a private key in the transcription unit;

receiving said encrypted entertainment content and said encrypted signed policy over said one or more first secure, authenticated communication channels;

decrypting said encrypted entertainment content to provide decrypted entertainment content;

decrypting said encrypted signed policy with the private key to provide a decrypted policy;

establishing a second secure, authenticated communication channel with a hardware graphics unit, hardware audio unit, or hardware device unit;

re-encrypting at least said decrypted entertainment content such that only said hardware graphics unit, hardware audio unit, or hardware device unit is permitted to decrypt at least said re-encrypted entertainment content;

receiving, over the second secure, authenticated communication channel, a request associated with the usage of the entertainment content from said hardware graphics unit, hardware audio unit, or hardware device unit;

sending, over the second secure, authenticated communication channel, said re-encrypted entertainment content to said hardware graphics unit, hardware audio unit, or hardware device unit;

determining whether the entertainment content has been utilized based, at least in part, on said received request associated with the usage of the entertainment content, wherein utilizing the entertainment content comprises at least one of:
  copying the entertainment content; or
  playing the entertainment content;
  and responsive to determining the entertainment content has been utilized:
  generating at least one indication of the utilization of said encrypted entertainment content; and
  updating said decrypted policy to reflect the utilization of said encrypted entertainment content.

2. The device as described in claim 1, the transcription unit further configured to perform operations comprising:
  receiving, over the one or more first secure, authenticated communication channels, an encrypted content key, said encrypted content key encrypted with a public key corresponding to a private key in the hardware transcription unit, wherein the capability of decrypting said encrypted entertainment content comprises decrypting said encrypted content key with the private key to provide a decrypted content key and decrypting said encrypted entertainment content with the decrypted content key.

3. The device as described in claim 1, the transcription unit further configured to perform operations comprising:
  receiving, over the one or more first secure, authenticated communication channels, a previously double-encrypted content key, said previously double-encrypted content key encrypted with a public key corresponding to a private key in the hardware transcription unit and said previously double-encrypted content key having been doubly encrypted and decrypted to provide said previously double-encrypted content key by a policy unit prior to receipt by the hardware transcription unit thereby prohibiting the policy unit from being able to decrypt the previously double-encrypted content key to provide a decrypted content key,
  wherein the transcription unit is further configured to decrypt said encrypted entertainment content by decrypting said previously double-encrypted content key with the private key to provide a decrypted content key and decrypting said encrypted entertainment content with the decrypted content key.

4. The device as described in claim 3, wherein said previously double-encrypted content key is not received from said policy unit without said policy unit determining that a policy permits said hardware graphics unit, hardware audio unit, or hardware device unit to use said re-encrypted entertainment content.

5. The device as described in claim 1, wherein re-encrypting said decrypted entertainment content and said decrypted policy further comprises receiving a public key corresponding to a private key of said hardware graphics unit, hardware audio unit, or hardware device unit and re-encrypting said decrypted entertainment content and said decrypted policy with said public key.

6. The device as described in claim 1, the transcription unit further configured to perform operations comprising:
  combining said decrypted entertainment content and said decrypted policy prior to re-encrypting said decrypted entertainment content to provide a combination of said decrypted entertainment content and said decrypted policy,
  wherein re-encrypting said decrypted entertainment content further comprises re-encrypting the combination.

7. The device as described in claim 1, wherein the second secure, authenticated communication channel is established with said hardware graphics unit and wherein the transcription unit is further configured to perform operations comprising:
  establishing a third secure, authenticated communication channel with said hardware audio unit;
  re-encrypting a second time said decrypted entertainment content such that only said hardware audio unit is capable of decrypting the second re-encrypted entertainment content; and
  providing, over the third secure, authenticated communication channel, said second re-encrypted entertainment content to said hardware audio unit.

8. The device as described in claim 1, wherein the second secure, authenticated communication channel is established with said hardware device unit.

9. A method comprising:
  establishing a secure, authenticated communication channel between distributed hardware units, the distributed hardware units comprising a transcription unit and a graphics or audio unit effective to enable the transcription unit to securely provide and the graphics or audio unit to securely receive entertainment content and associated policy with a hardware-based level of security, the graphics or audio unit further configured to:
    decrypt the entertainment content and associated policy; and
    mix the entertainment content with audio or video from other sources;
  establishing a second secure, authenticated communication channel between said graphics or audio unit and an output device capable of rendering the entertainment content and mixed entertainment content;

receiving, over the second secure, authenticated communication channel, a request associated with the usage of the entertainment content from said graphics or audio unit;

determining, with the transcryption unit, whether the entertainment content has been utilized based, at least in part, on said received request associated with the usage of the entertainment content, wherein utilizing the entertainment content comprises at least one of:

copying the entertainment content; or playing the entertainment content;

and responsive to determining the entertainment content has been utilized:

generating, using the transcryption unit, at least one indication of the utilization of said encrypted entertainment content; and updating, using the transcryption unit, said associated policy to reflect the utilization of said encrypted entertainment content.

10. The method as described in claim 9, wherein the transcryption unit is part of a digital rights management (DRM) domain having one or more other transcryption units and further comprising establishing a second secure, authenticated communication channel between at least one of said one or more other transcryption units and said graphics or audio unit.

11. The method as described in claim 10, wherein the transcryption unit and said one or more other transcryption units have a same cryptographic key pair.

12. The method as described in claim 10, wherein the transcryption unit has a first cryptographic key pair and said one or more other transcryption units have a second cryptographic key pair, the first cryptographic key pair and the second cryptographic key pair being different.

13. The method as described in claim 12, further comprising receiving a content key at the transcryption unit that is encrypted with the first cryptographic key pair or at said one or more other transcryption units that is encrypted with the second cryptographic key pair, the first cryptographic key pair providing a hardware-based level of security and the second cryptographic key pair providing a software-based level of security.

14. The method as described in claim 9, wherein the act of establishing the secure, authenticated communication channel comprises establishing said channel using cryptographic certificates for each of the distributed hardware units.

15. The method as described in claim 9, further comprising establishing a third secure, authenticated communication channel between said graphics or audio unit and a second output device effective to enable the graphics or audio unit to securely provide the entertainment content to either or both of the first-mentioned output device and the second output device.

16. The method as described in claim 9, wherein said secure, authenticated communication channel is between said transcryption unit and said graphics unit and further comprising establishing a third secure, authenticated communication channel between said transcryption unit and a different, second graphics unit, the first-mentioned and second authenticated communication channels enabling secure receipt of the entertainment content by said first graphics unit and said second graphics unit, respectively.

17. One or more computer-readable storage memories comprising processor-executable instructions which, responsive to execution by at least one processor, are configured to enable a device to:

establish a secure, authenticated communication channel between distributed hardware units, the distributed hardware units comprising a transcryption unit and a graphics or audio unit effective to enable the transcryption unit to securely provide and the graphics or audio unit to securely receive entertainment content and associated policy with a hardware-based level of security, the graphics or audio unit further configured to:

decrypt the entertainment content and associated policy; and mix the entertainment content with audio or video from other sources;

establish a second secure, authenticated communication channel between said graphics or audio unit and an output device capable of rendering the entertainment content and mixed entertainment content;

receiving, over the second secure, authenticated communication channel, a request associated with the usage of the entertainment content from said graphics or audio unit;

determine whether the entertainment content has been utilized based, at least in part, on the received request associated with the usage of the entertainment content, wherein utilizing the entertainment content comprises at least one of:

copying the entertainment content; or playing the entertainment content;

and responsive to determining the entertainment content has been utilized:

generate at least one indication of the utilization of said encrypted entertainment content; and update said associated policy to reflect the utilization of said encrypted entertainment content.

18. The one or more computer-readable storage memories of claim 17, wherein processor-executable instructions are further configured to enable the device to establish the secure, authenticated communication channel by establishing said channel using cryptographic certificates for each of the distributed hardware units.

19. The one or more computer-readable storage memories of claim 17, wherein the processor-executable instructions are further configured to enable the device to establish a third secure, authenticated communication channel between said graphics or audio unit and a second output device effective to enable the graphics or audio unit to securely provide the entertainment content to either or both of the first-mentioned output device and the second output device.

* * * * *